Feb. 4, 1958            D. W. KELBEL            2,821,867
TWO PATH POWER FLOW TURBINE TRANSMISSION
Filed March 13, 1952
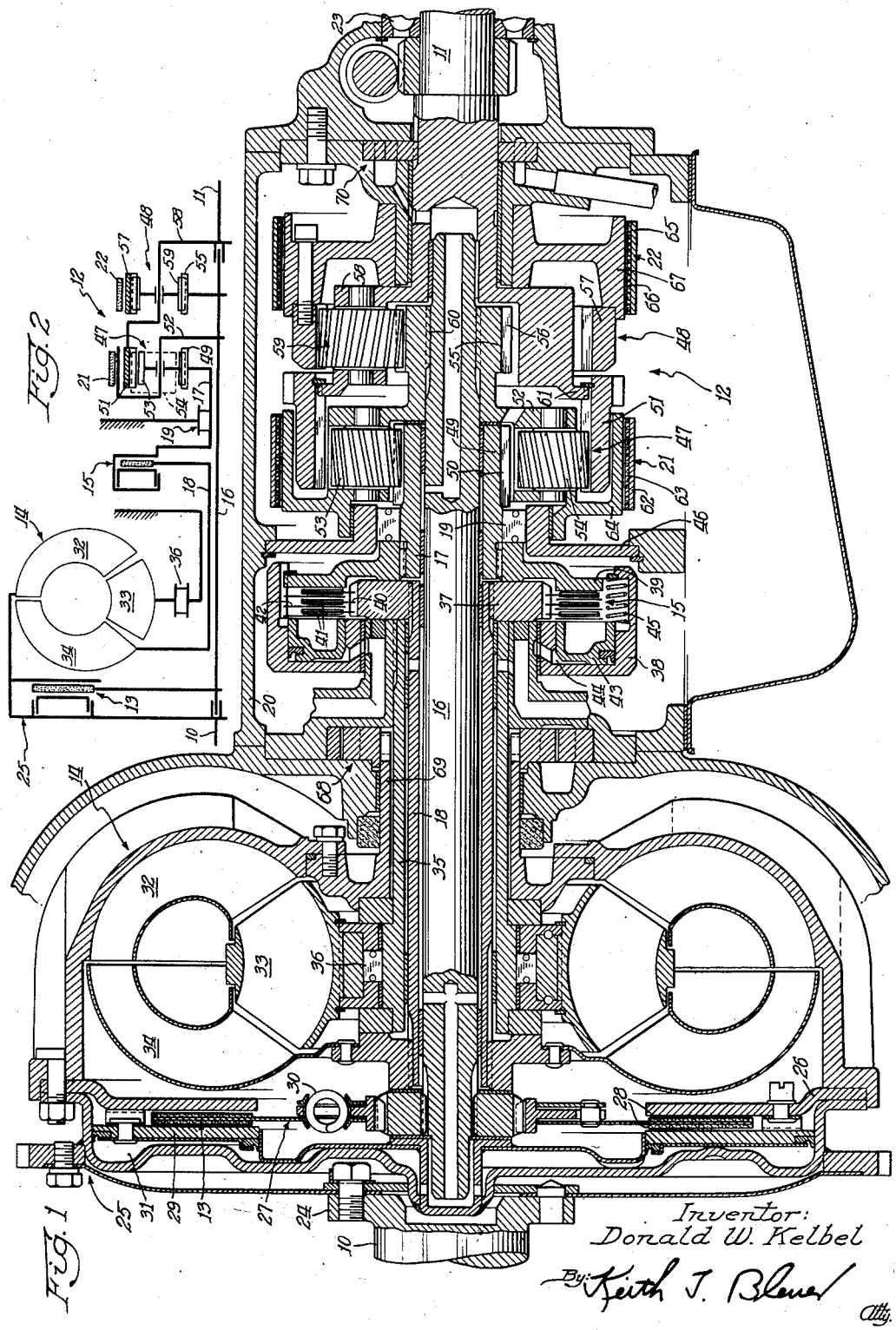
Inventor:
Donald W. Kelbel United States Patent Office 2,821,867
Patented Feb. 4, 1958

2,821,867

TWO PATH POWER FLOW TURBINE TRANSMISSION

Donald W. Kelbel, Muncie, Ind., assignor to Borg-Warner Corporation, Chicago, Ill., a corporation of Illinois Application March 13, 1952, Serial No. 276,391

16 Claims. (Cl. 74—688)

This invention relates to power transmission mechanism and more particularly to a transmission for use in transmitting power from the engine to the drive wheels of an automotive vehicle.

It is an object of the present invention to provide an improved transmission mechanism.

Another object of the invention is to provide an improved transmission arrangement utilizing a friction clutch and a hydraulic torque converter to achieve a two-path power flow drive to a planetary gear set.

An additional object of the invention is to provide a transmission mechanism which can be readily changed between a relatively low speed mechanical drive and a relatively high speed partially mechanical and partially hydraulic drive by the engagement or disengagement of a single friction clutch.

A further object of the invention is to provide an improved transmission which can be readily changed between a full mechanical drive and a full hydraulic drive.

Still another object of the present invention is to provide a transmission in which low speed forward and reverse drives are completed through a hydraulic torque converter, intermediate speed forward drive is completed mechanically through a friction clutch and high speed forward drive is completed partially mechanically through the friction clutch and partially hydraulically through the hydraulic torque converter.

A still further object of the invention is to provide an improved transmission mechanism utilizing planetary gearing to provide a low speed forward and a reverse drive with the reverse drive providing a slower drive speed than low speed forward drive.

My improved transmission in a preferred form includes generally a compound planetary gear set connected to the vehicle engine by means of a friction clutch and/or clutch means including a hydraulic torque converter and another friction clutch arranged in series. A one-way brake is provided for preventing reverse rotation of one of the elements of the gear set, and friction brakes are utilized for braking two other elements of the gear set. The arrangement is such that low and reverse drive ratios are hydraulic drives completed through the hydraulic torque converter, an intermediate forward drive ratio is a full mechanical drive completed through the first friction clutch and a high speed forward drive utilizes two paths of power flow, one through the first friction clutch and the other through the hydraulic torque converter and the second friction clutch, to give substantially direct drive between a drive shaft and a driven shaft. The particular gear set and the utilization thereof is such that the reverse drive ratio is somewhat slower than the low speed forward drive ratio, an advantageous feature frequently unobtainable in transmissions utilizing planetary gearing.

Other objects, features and advantages of the present invention will be apparent from the following detailed description of one embodiment, by way of preferred example only, taken in conjunction with the accompanying drawing, in which:

Fig. 1 is a longitudinal, sectional view of the transmission mechanism according to the present invention, with some parts shown in elevation; and Fig. 2 is a schematic diagram of the transmission for clearly illustrating the operation thereof.

Referring now to the figures, the reference numeral 10 designates a drive shaft which may be driven by the engine of an automotive vehicle (not shown) and which is arranged to drive a driven shaft 11 through a compound planetary gear set 12. The gear set 12 may be connected with the drive shaft 10 either alternately or concurrently through coupling means comprising a friction clutch 13 or through coupling means including a hydraulic torque converter 14 in series with a friction clutch 15. The clutch 13 is arranged for delivering one path of power flow to the gear set 12 through an intermediate shaft 16, and another path of power flow may be delivered to the gear set 12 through the torque converter 14 and the clutch 15 by means of an additional shaft 17 disposed between the clutch 15 and the gear set 12. A sleeve shaft 18 is disposed between the torque converter 14 and the clutch 15. A one-way or overrunning brake 19 is provided between the shaft 17 and a portion of the stationary transmission casing 20. The one-way brake 19 is arranged to allow forward rotation of the shaft 17 but engages to prevent reverse rotation thereof. Friction brakes 21 and 22 are provided for braking respective members of the gear set 12 for purposes to be described.

The driven shaft 11 is rotatably supported in the transmission housing 20 by means of an anti-friction bearing 23. The intermediate shaft 16 is rotatably supported in the transmission by having its end portions journaled in the corresponding ends of the drive shaft 10 and the driven shaft 11.

The drive shaft 10 has an integral annular end flange 24 which is bolted to a flywheel assembly 25. An annular clutch backing plate 26 is bolted to the flywheel assembly 25. A clutch plate assembly 27 is splined to the intermediate shaft 16 and has a pair of annular clutch facings 28, 28 secured to opposite sides thereof. The clutch facings 28 are adapted to be clamped between the backing plate 26 and an annular axially movable piston 29 in order to drivingly connect the drive shaft 10 with the intermediate shaft 16. The clutch plate assembly 27, the backing plate 26 and the piston 29 constitute the friction clutch 13. The clutch plate assembly 27 may be provided with chatter-dampening springs 30 of any suitable design and arrangement. The clutch 13 may be engaged by supplying fluid under pressure to an annular pressure chamber 31 to move the piston 29 toward the clutch plate 27.

The hydraulic torque converter 14 includes an annular internally vaned impeller member 32, a vaned stator 33 and a vaned rotor 34. The impeller member 32 and the flywheel assembly 25 are securely bolted to one another and provide a substantially sealed torque converter chamber which is mostly filled with a fluid such as hydraulic or lubricating oil. The stator 33 is carried by a stationary sleeve 35. An overrunning or one-way brake 36 is disposed between the stator 33 and a portion of the sleeve 35, the one-way brake 36 being of any suitable construction such as the sprag type shown to permit forward rotation of the stator 33 but to prevent reverse rotation thereof. The rotor 34 is splined to the sleeve shaft 18.

As is well-known in the art, rotation of the impeller member 32 will cause rotation of the rotor 34 at an increased torque due to the fluid reaction against the stator 33 tending to rotate the stator in a reverse direction and causing engagement of the one-way brake 36 to hold the stator stationary. When the speed of rotation of the rotor 34 approaches that of the impeller 32, the fluid reaction on the vanes of the stator 33 will be reversed, and the stator will begin to rotate in a forward direction with the brake 36 overrunning. Thereafter, the torque converter 14 operates as an ordinary fluid coupling with the impeller member 32, the rotor 34 and the stator 33 all rotating at substantially the same speed.

The friction clutch 15 comprises an inner clutch member 37 splined to the sleeve shaft 18 and an outer drum portion 38 splined to a clutch backing member or plate 39 which is, in turn, splined to the additional shaft 17. The inner clutch member 37 has a plurality of annular clutch plates 40 splined thereto with the clutch plates 40 each having clutch faces 41 on each side thereof. Interleaved with the clutch plates 40 are a plurality of clutch discs 42 which are internally splined in the drum 38. An annular piston 43 is disposed in the drum 38 and is adapted to clamp the disc 42 and the plates 40 together between the piston and the backing plate 39 to engage the clutch 15 when fluid under pressure is introduced into an annular pressure chamber 44 formed between the piston and an axially inwardly facing surface of the drum 38. Compression springs 45 are disposed in the drum 38 for urging the piston 43 to clutch disengaging position when the fluid pressure is released.

The one-way brake 19 may be of the sprag type illustrated and is disposed between the additional shaft 17 and a stationary member 46 secured to the transmission casing 20. As previously described, the one-way brake 19 permits forward rotation of the shaft 17 but prevents reverse rotation thereof.

The compound planetary gear set 12 includes a double planetary gear set 47 and a single planetary gear set 48. The gear set 47 comprises a sun gear 49 formed by integral teeth 50 provided on the additional shaft portion 17, an internally toothed ring gear 51 and a planet gear carrier 52 which rotatably carries a plurality of planet gears 53 in mesh with the sun gear 49 and a plurality of planet gears 54 in mesh with the planet gears 53 and with the ring gear 51. The planetary gear set 48 comprises a sun gear 55 provided by external teeth 56 formed on an integral extension sleeve portion of the carrier 52, an internally toothed ring gear 57 and a planet gear carrier 58 which rotatably carries a planet gear 59 which is in mesh with the sun gear 55 and the ring gear 57. The carrier 58 is fixedly secured to the driven shaft 11 as by being formed integrally therewith as shown. The carrier 52 and the sun gear 55 are splined to the intermediate shaft 16 at 60. The ring gear 51 of the gear set 47 is fixedly secured to the driven shaft 11 through an integral extension portion 61 formed on the carrier 58 and engaging the internal teeth of the ring gear.

The friction brake 21 comprises a substantially annular brake band 62 with a substantially annular inner brake lining 63 secured thereto. The band 62 may be peripherally contracted by any suitable means such as a hydraulic cylinder (not shown) in order to clamp the outer periphery of a brake drum 64, which is formed as an extension of the carrier 52, in order to brake the carrier.

The friction brake 22 comprises a substantially annular brake band 65 with a substantially annular brake lining 66 secured about the inner surface thereof. The brake band 65 may be peripherally contracted by any suitable means such as a hydraulic cylinder (not shown) about the outer periphery of a brake drum member 67 which is fixedly secured to the ring gear 57. Thus, engagement of the brake 22 will brake the ring gear 57.

Means are provided for lubricating the various moving parts of the transmission and for supplying fluid under pressure for actuating the various clutches and brakes. Herein such means comprise a fluid pump 68 driven by the drive shaft 10 through the flywheel 25, the impeller member 32 and a sleeve member 69 which is fixedly secured to the impeller 32. Also included is a fluid pump 70 which is driven by the driven shaft 11 as shown. The manner in which fluid under pressure is admitted behind the various clutch and brake actuating pistons does not constitute a portion of this invention, but any suitable control means may be utilized.

A low speed forward drive ratio is provided between the drive shaft 10 and the driven shaft 11 by engaging the friction clutch 15 and the friction brake 21. As will be seen, the drive is through the flywheel 25, the hydraulic torque converter 14, the sleeve shaft 18, the friction clutch 15, the additional shaft 17, the sun gear 49, the planet gears 53 and 54 and the ring gear 51 which is fixedly secured to the driven shaft 11 through the carrier 58. In this gear ratio the carrier 52 which is held stationary by the friction brake 21 acts as the reaction member so that a substantially reduced speed drive of the driven shaft 11 will be provided through the double planetary gearing. It will be noted that the drive is through the hydraulic torque converter so that substantial torque multiplication is available.

An intermediate speed forward drive ratio is provided by engagement of the friction clutch 13 and disengagement of the clutch 15 and the brake 21. This ratio is a full mechanical drive through the clutch 13, the intermediate shaft 16, the carrier 52, the planet gears 53 and 54 and the ring gear 51 to the driven shaft 11. Rotation of the carrier in a forward direction in the double planetary gear set 47 will tend to rotate the sun gear 49 in a reverse direction because of the resistance of the driven shaft 11 which is transmitted through the double planetary gearing to the sun gear. However, the one-way brake 19 engages to prevent reverse rotation of the sun gear 49, so that the sun gear will act as the reaction member and the ring gear 51 will be driven forwardly at an underdrive as in well-known in the case of double planetary gearing when the carrier is driven and the sun is held stationary. It is readily apparent that the driven shaft 11 will be rotated at an increased speed in intermediate drive ratio as compared to the low ratio drive.

A high speed forward drive ratio is obtained through the transmission by engaging the friction clutch 15 with the friction clutch 13 remaining engaged. Thus, the drive shaft 10 will continue to drive the carrier 52 through the intermediate shaft 16, but at the same time the sun gear 49 will be driven forwardly through the hydraulic torque converter 14 and the friction clutch 15 with the one-way brake 19 overrunning. Since the sun gear 49 will be rotated at substantially the same speed as the carrier 52, the gear set will be locked and a substantially direct drive will result. It will be seen that two parallel paths of power flow will be provided in high speed drive, one through the inetrmediate shaft 16 and the other through the additional shaft 17.

If, for example, the ring gears 51 and 57 are provided with 51 teeth and the sun gears 49 and 55 are provided with 21 teeth, the low speed drive ratio will be 2.428 to 1.000, the intermediate speed drive ratio will be 1.700 to 1.000 and the high speed drive ratio will be substantially 1.000 to 1.000. With the assumed number of teeth in the gears the resultant power flows in high speed drive will be approximately 59% mechanical and 41% hydraulic. The amount of torque carried by the hydraulic torque converter in high speed drive is substantially reduced over that obtained with a 100% torque converter drive so that slippage is reduced, the heat generated and the consequent power loss are lessened, but some of the torque multiplying effect of the torque converter is retained in order to provide for increased torque for handling increased loads while operating in this speed ratio.

The transmission is changed to reverse drive ratio by disengaging the clutch 13 and engaging the friction brake 22 with the clutch 15 engaged and the brake 21 disengaged. As a result, the sun gear 49 is driven from the vehicle engine, and it therefore can be assumed that the sun gear 49 begins to rotate in the forward direction. Under these conditions, the carrier 52 will rotate backwardly carrying the sun gear 55 with it, which tends to produce a forward rotation of the ring gear 57 and the drum 67 fixed thereto; and as a result of this forward rotation of the ring gear 57, the carrier 58 and the driven shaft 11 will be rotated in the reverse direction. The power flow is then through the torque converter 14, the sleeve shaft 18, the friction clutch 15, the additional shaft 17, the sun gear 49, the planet gears 53 and 54, the ring gear 51, the carrier 58 and the planet gear 59. Since the gun gear 55 and the carrier 52 are fixedly secured together, the reaction force provided by the ring gear 57 imparts a reduced drive in the reverse direction to the carrier 58 and the driven shaft 11.

A somewhat slower drive can be obtained in reverse from that obtained in low with the compound planetary gearing of the present invention. For example, if both of the ring gears 51 and 57 are provided with 51 teeth and both of the sun gears 49 and 55 are provided with 21 teeth as noted in the example above, the resultant drive ratio in reverse will be 2.472 to 1.000 which is somewhat slower than the low speed ratio noted. As will be readily understood this lower speed in reverse is desirable although is usually unobtainable in a planetary gear set.

From the foregoing description it will be readily understood that the present invention provides an improved transmission mechanism in which a hydraulic drive is provided in both low speed forward drive ratio and reverse drive ratio, the drive being through a compound planetary gear set giving a slower speed of driven shaft rotation in reverse drive than in low speed drive. The intermediate speed forward drive is a full mechanical drive and the high speed drive is substantially one to one with a two path power flow, one path being mechanical and the other being hydraulic. Thus, the disadvantages of hydraulic drive in high speed ratio are substantially lessened while the torque multiplying feature is retained. In addition, since friction type engaging means are used throughout, all of the ratio changes can be made while continuously applying power to the driven shaft.

It will be understood that modifications and variations may be effected without departing from the scope of the novel concepts of the present invention.

I claim:

1. In a transmission adapted for providing a plurality of speed ratios, the combination of a drive shaft, a driven shaft, an intermediate shaft, a first friction clutch for transmitting torque from said drive shaft to said intermediat shaft, an additional shaft and a sleeve shaft arranged in series, a hydraulic torque converter for transmitting torque from said drive shaft to said sleeve shaft, a second friction clutch for transmitting torque from said sleeve shaft to said additional shaft, a planetary gear set including a sun gear connected to said additional shaft, a ring gear connected to said driven shaft and a planet gear carrier connected to said intermediate shaft, said carrier having a planet gear in mesh with said sun gear and said ring gear, and a one-way brake disposed between said additional shaft and a stationary portion of said transmission for allowing rotation of the additional shaft in one direction but engaging to prevent rotation thereof in the opposite direction, one of said speed ratios being completed through said first friction clutch with said one-way brake engaged and said second friction clutch disengaged, and another of said speed ratios being completed through both said first friction clutch and said torque converter by engaging said second friction clutch to cause disengagement of said one-way brake to transmit power concurrently through said intermediate shaft and said sleeve and additional shafts.

2. In a transmission adapted for providing a plurality of drive ratios, the combination of a drive shaft, a driven shaft, a gear set having a plurality of elements with a first one of the elements arranged for driving said driven shaft, an intermediate shaft adapted for driving a second one of said gear set elements, first coupling means for transmitting torque from said drive shaft to said intermediate shaft, an additional shaft adapted for driving a third one of said gear set elements, second coupling means for transmitting torque from said drive shaft to said additional shaft, a one-way brake disposed between said additional shaft and a stationary portion of said transmission for allowing rotation of the additional shaft in one direction but engaging to prevent rotation thereof in the opposite direction, and brake means for braking said intermediate shaft and said second gear set element to complete one of said drive ratios through said second coupling means when said first coupling means are disengaged, another of said drive ratios being completed by disengagement of said brake means and said second coupling means and engagement of said first coupling means to cause engagement of said one-way brake.

3. In a transmission adapted for providing a plurality of drive ratios, the combination of a drive shaft, a driven shaft, a gear set having a plurality of elements with a first one of said elements arranged for driving said driven shaft, an intermediate shaft adapted for driving a second one of said gear set elements, a first friction clutch for transmitting torque from said drive shaft to said intermediate shaft, an additional shaft for driving a third one of said gear set elements, torque transmitting means including a hydraulic torque converter and a second friction clutch for transmitting torque from said drive shaft to said additional shaft, a one-way brake disposed between said additional shaft and a stationary portion of said transmission for allowing rotation of the additional shaft in one direction but engaging to prevent rotation thereof in the opposite direction, a friction brake for braking said intermediate shaft and said second gear set element to complete one of said drive ratios through said hydraulic torque converter when said second friction clutch is engaged and said first friction clutch is disengaged, another of said drive ratios being completed by disengagement of said friction brake and said second friction clutch and engagement of said first friction clutch to cause engagement of said one-way brake.

4. In a transmission adapted for providing a plurality of drive ratios, the combination of a drive shaft, a driven shaft, an intermediate shaft, a sleeve shaft and an additional shaft arranged in series with one another and in parallel with said intremediate shaft, a first friction clutch for transmitting torque from said drive shaft to said intermediate shaft, a hydraulic torque converter for transmitting torque between said drive shaft and said sleeve shaft, a second friction clutch for transmitting torque between said sleeve shaft and said additional shaft, a compound planetary gear set including a first sun gear connected to said additioal shaft, a first ring gear connected to said driven shaft, a first planet gear carrier connected to said intermediate shaft, said carrier having a first planet gear in mesh with said first sun gear and a second planet gear in mesh with said first planet gear and said first ring gear, a second sun gear connected to said intermediate shaft, a second ring gear, a second planet gear carrier connected to said drive shaft, said second carrier having a third planet gear in mesh with said second sun gear and said second ring gear, a friction brake for braking said intermediate shaft, a one-way brake disposed between said additional shaft and a stationary portion of said transmission for allowing rotation of the additional shaft in one direction but engaging to prevent rotation thereof in the opposite direction, one of said drive ratios being completed through said hydraulic torque converter when said first friction clutch and said friction brake are engaged, another of said drive ratios being completed by disengagement of said friction brake and said second friction clutch and engagement of said first friction clutch to cause engagement of said one-way brake.

5. In a transmission arranged for providing a plurality of forward speed drives, the combination of a drive shaft, a driven shaft, a gear set having a plurality of elements with a first one of said elements connected to said driven shaft, an intermediate shaft connected for driving a second one of said gear set elements, an additional shaft connected for driving a third one of said gear set elements, first coupling means for transmitting torque from said drive shaft to said intermediate shaft, second coupling means for transmitting torque from said drive shaft to said additional shaft, a one-way brake disposed between said additional shaft and a stationary portion of said transmission for allowing rotation of the additional shaft in one direction but engaging to prevent rotation thereof in the opposite direction, and brake means for braking said intermediate shaft and said second gear set element to complete a low-speed one of said forward drives through said gear set when said second coupling means are engaged and said first coupling means are disengaged, said one-way brake engaging when said first coupling means are engaged and said second coupling means and said brake means are disengaged to complete an intermediate speed one of said forward drives between said drive and driven shafts through said gear set, a high speed drive being completed through both said intermediate shaft and said additional shaft when both said first coupling means and said second coupling means are engaged and said brake means are disengaged.

6. In a transmission arranged for providing a plurality of forward speed drives, the combination of a drive shaft, a driven shaft, a planetary gear set having a plurality of elements with a first one of said elements connected to said driven shaft, an intermediate shaft connected for driving a second one of said gear set elements, an additional shaft associated with a third one of said gear set elements for driving the same, a first clutch for transmitting torque from said drive shaft to said intermediate shaft, torque transmitting means including a second friction clutch and a hydraulic torque converter arranged for transmitting torque between said drive shaft and said additional shaft, a one-way brake associated with said third gear set element for allowing rotation of the third gear set element in one direction but engaging to prevent rotation thereof in the opposite direction, said one-way brake engaging when said first clutch is engaged to complete an intermediate speed one of said forward drives between said drive and driven shafts through said gear set, a high speed one of said forward drives being completed between said drive and driven shafts when said first and second clutches are engaged, said high speed drive embodying a first path of power flow through said first clutch and said intermediate shaft and a second path of power flow through said torque converter and said additional shaft, a brake for braking said second gear set element to complete a low speed one of said forward drives through said torque converter and said gear set when said second clutch is engaged and said first clutch is disengaged.

7. In a transmission arranged for providing a high speed forward drive, an intermediate speed forward drive, and a low speed forward drive, the combination of a drive shaft, a driven shaft, a planetary gear set having a plurality of elements with a first one of said elements connected to said driven shaft, an intermediate shaft arranged for driving a second one of said gear set elements, a first friction clutch for transmitting torque from said drive shaft to said intermediate shaft, a sleeve shaft, an additional shaft arranged for driving a third one of said gear set elements, a hydraulic torque converter for transmitting torque from said drive shaft to said additional shaft, a second friction clutch for connecting said sleeve shaft with said additional shaft, a one-way brake disposed between said additional shaft and a stationary portion of said transmission for allowing rotation of the additional shaft in one direction but engaging to prevent rotation thereof in the opposite direction, a friction brake for braking said second gear set element, said low speed forward drive being completed through said torque converter by engagement of said friction brake and said second friction clutch with said first friction clutch disengaged, said intermediate speed forward drive being completed through said first friction clutch with said one-way brake engaged and said friction brake disengaged, and said high speed forward drive being completed through both said first friction clutch and said torque converter when said second friction clutch is engaged causing disengagement of said one-way brake.

8. In a transmission arranged for providing a plurality of forward speed drives, the combination of a drive shaft, a driven shaft, an intermediate shaft, an additional shaft, first coupling means for transmitting torque from said drive shaft to said intermediate shaft, second coupling means for transmitting torque from said drive shaft to said additional shaft, a planetary gear set including a sun gear connected to said additional shaft, a ring gear connected to said driven shaft, and a planet gear carrier connected to said intermediate shaft, said carrier having a first planet gear in mesh with said sun gear and a second planet gear in mesh with said first planet gear and said ring gear, a one-way brake disposed between said additional shaft and a stationary portion of said transmission for allowing rotation of the additional shaft in one direction but engaging to prevent rotation thereof in the opposite direction, brake means for braking said planet gear carrier to complete a low speed one of said forward drives through said second coupling means and said gear set when said first coupling means are disengaged, said one-way brake engaging when said first coupling means are engaged and said second coupling means are disengaged to complete an intermediate speed one of said forward drives between said drive and driven shafts through said gear set, a high speed one of said forward drives being completed between said drive shaft and said driven shaft when said first coupling means and said second coupling means are engaged and said brake means are disengaged whereby said high speed drive embodies one path of power flow through said intermediate shaft and another path of power flow through said additional shaft.

9. In a transmission arranged for providing three forward speed drives, the combination of a drive shaft, a driven shaft, an intermediate shaft, an additional shaft and a sleeve shaft arranged in series with one another and in parallel with said intermediate shaft, a first friction clutch for transmitting torque from said drive shaft to said intermediate shaft, a hydraulic torque converter arranged for transmitting torque between said drive shaft and said sleeve shaft, a second friction clutch for transmitting torque from said sleeve shaft to said additional shaft, a planetary gear set including a sun gear connected to said additional shaft, a ring gear connected to said driven shaft and a planet gear carrier connected to said intermediate shaft, said carrier having a first planet gear in mesh with said sun gear and a second planet gear in mesh with said first planet gear and said ring gear, a one-way brake disposed between said additional shaft and a stationary portion of said transmission for allowing rotation of the additional shaft in one direction but engaging to prevent rotation thereof in the opposite direction, a first friction brake for braking said carrier to complete a low speed one of said forward drives through said torque converter and said gear set when said second friction clutch is engaged and said first friction clutch is disengaged, said one-way clutch engaging when said first friction clutch is engaged and said second friction clutch and said friction brake are disengaged to complete an intermediate speed one of said forward drives between said drive and driven shafts through said gear set, a high speed one of said forward drives being completed when said first and second clutches are engaged and said friction brake is disengaged, said high speed drive embodying a first path of power flow through said intermediate shaft and a second path of power flow through said torque converter and said sleeve and additional shafts.

10. In a transmission arranged for providing a plurality of forward speed drives and a reverse drive, the combination of a drive shaft, a driven shaft, a gear set having a plurality of elements with a first one of said elements connected to said driven shaft, an intermediate shaft connected for driving a second one of said gear set elements, an additional shaft associated with a third one of said gear set elements for driving the same, torque transmitting means arranged for transmitting torque between said drive shaft and said additional shaft, a one-way brake disposed between said additional shaft and a stationary portion of said transmission for allowing rotation of the additional shaft in one direction but engaging to prevent rotation thereof in the opposite direction, engaging means for transmitting torque from said drive shaft to said intermediate shaft, a high speed one of said forward drives being completed between said drive and driven shafts through both said torque transmitting means and said engaging means, said high speed drive embodying a first path of power flow through said engaging means and said intermediate shaft and a second path of power flow through said torque transmitting means and said additional shaft, said one-way brake engaging when said engaging means are engaged and said torque transmitting means are disengaged to complete an intermediate speed one of said forward drives between said drive and driven shafts through said gear set, first brake means for braking said second gear set element to complete a low speed one of said forward drives through said torque transmitting means and said gear set when said engaging means are disengaged, and second brake means for braking a third one of said gear set elements to complete said reverse drive through said torque transmitting means and said gear set when said engaging means and said first brake means are disengaged.

11. In a transmission arranged for providing a high speed forward drive, an intermediate speed forward drive, a low speed forward drive and a reverse drive, the combination of a drive shaft, a driven shaft, a planetary gear set having a plurality of elements with a first one of said elements connected to said driven shaft, an intermediate shaft arranged for driving a second one of said gear set elements, a first friction clutch for connecting said drive shaft with said intermediate shaft, a sleeve shaft, an additional shaft arranged for driving a third one of said gear set elements, a hydraulic torque converter for transmitting torque from said driven shaft to said sleeve shaft, a second friction clutch for connecting said sleeve shaft with said additional shaft, a one-way brake disposed between said additional shaft and a stationary portion of said transmission for allowing rotation of said second shaft portion in one direction but engaging to prevent rotation thereof in the opposite direction, a first friction brake for selectively braking said second one of said gear set elements, and a second friction brake for selectively braking a fourth one of said gear set elements, said reverse and low speed forward drives being completed through said torque converter by selective manipulation of said friction brakes with said second friction clutch engaged, said intermediate speed forward drive being completed through said first friction clutch with said second friction clutch and said friction brakes disengaged and said one-way brake engaged, and said high speed forward drive being completed through both said first friction clutch and said torque converter when said second friction clutch is engaged.

12. In a transmission arranged for providing a high speed forward drive, an intermediate speed forward drive, a low speed forward drive and a reverse drive, the combination of a drive shaft, a driven shaft, an intermediate shaft, an additional shaft and a sleeve shaft arranged in series with one another and in parallel with said intermediate shaft, a first friction clutch for transmitting torque from said drive shaft to said intermediate shaft, a hydraulic torque converter for transmitting torque between said drive shaft and said sleeve shaft, a second friction clutch for transmitting torque between said sleeve shaft and said additional shaft, a compound planetary gear set including a first sun gear connected to said additional shaft, a first ring gear connected to said driven shaft, a first planet gear carrier connected to said intermediate shaft, said carrier having a first planet gear in mesh with said first sun gear and a second planet gear in mesh with said first planet gear and said first ring gear, a second sun gear connected to said intermediate shaft, a second ring gear, a second planet gear carrier connected to said driven shaft, said second carrier having a third planet gear in mesh with said second sun gear and said second ring gear, a first friction brake for braking said intermediate shaft, a second friction brake for braking said second ring gear, a one-way brake disposed between said additional shaft and a stationary portion of said transmission for allowing rotation of the additional shaft in one direction but engaging to prevent rotation thereof in the opposite direction, said reverse and low speed forward drives being completed through said torque converter by selective manipulation of said friction brakes with said second friction clutch engaged, said intermediate speed forward drive being completed through said first friction clutch with said second friction clutch and said friction brakes disengaged and said one-way brake engaged, and said high speed forward drive being completed through both said first friction clutch and said torque converter when said second friction clutch is engaged and said friction brakes are disengaged.

13. In a transmission, the combination of a drive shaft, a driven shaft, a hydraulic torque converter driven by said drive shaft, a planetary gear set having a ring gear for a driven element connected with said driven shaft and first and second driving elements, said first and second driving elements constituting respectively a sun gear and a planet gear carrier with said carrier having two sets of intermeshing planet gears with one set of said planet gears in mesh with said sun gear and the other set of planet gears in mesh with said ring gear, said first driving element providing a low speed forward drive between the driving element and said driven shaft and said second driving element providing a higher intermediate speed forward drive between said second driving element and said driven shaft, means for connecting said first driving element with said torque converter for providing a single path combination hydraulic and geared drive between said shafts, means for connecting said second driving element directly with said drive shaft for providing a single path mechanical geared power train between said shafts, means for taking the reaction of said gear set for both of said drives, said two driving elements when both are connected by their resepctive means with said torque converter and said drive shaft providing a two path power flow hydraulic high speed drive between said shafts which is substantially a direct drive when the elements of said hydrodynamic device are rotating at substantially the same speed, and means for providing a reverse drive between said shafts and including means for taking the reaction of said gear set from another element of said gear set which causes said driven shaft to be rotated in the reverse direction when said first driving element is driven from said torque converter to provide a hydraulic reduced speed reverse drive between said shafts.

14. In a transmission, the combination of a drive shaft, a driven shaft, a hydraulic torque converter driven by said drive shaft, a planetary gear set having a ring gear for a driven element connected with said driven shaft and having a first and a second driving element, said first and second driving elements constituting respectively a sun gear and a planet gear carrier, said carrier having two sets of intermeshing planet gears with one set of said planet gears in mesh with said sun gear and the other set of planet gears in mesh with said ring gear, said gear set providing a low speed drive from said first driving element to said driven shaft when said second driving element is held from rotation, a friction brake for holding said second driving element from rotation, said gear set providing a higher intermediate speed forward drive from said second driving element to said driven shaft when said first driving element is held from rotation, a one-way brake for holding said first driving element from rotation, a clutch for connecting said first driving element with said hydraulic torque converter for completing a single path combination hydraulic and geared low speed drive between said shafts, a clutch for connecting said second driving element directly with said drive shaft for completing a higher speed intermediate forward drive exclusive of said torque converter from said drive shaft to said driven shaft, said two clutches when engaged providing a two path power flow combination hydraulic and geared drive between said shafts which is substantially a direct drive when the elements of said torque converter are rotating at substantially the same speed, and a friction brake for another element of said gear set for providing a single path hydraulic reverse drive through said torque converter from said drive shaft to said driven shaft when said first-named clutch is engaged.

15. In a transmission, the combination of a first planetary gear set, said first planetary gear set comprising a sun gear element, a ring gear element, a planet gear in mesh with the sun gear element, a second planet gear in mesh with the first planet gear and with said ring gear element and a carrier element for said planet gears, and a second planetary gear set, said second gear set comprising a sun gear member connected to the planet gear carrier of the first planetary gear set, a ring gear member, a planet gear in mesh with the sun and ring gear members and a planet gear carrier member connected to said ring gear of said first planetary gear set and rotatably supporting said last-named planet gear.

16. In a transmission, the combination of a first planetary gear set, said first planetary gear set comprising a sun gear element, a ring gear element, a planet gear in mesh with the sun gear element, a second planet gear in mesh with the first planet gear and with said ring gear element and a carrier element for said planet gears, a second planetary gear set, said second gear set comprising a sun gear member, a ring gear member, a planet gear in mesh with the sun and ring gear members and a planet gear carrier member for said last-named planet gear, said ring gear element being connected with said planet gear carrier member, and said planet gear carrier element being connected wtih said sun gear member, a brake for said planet gear carrier element, a brake for said ring gear member, and a brake for said sun gear element.

References Cited in the file of this patent

UNITED STATES PATENTS

| | | |
|---|---|---|
| 2,302,714 | Pollard | Nov. 24, 1942 |
| 2,353,905 | Keiley | July 18, 1944 |
| 2,372,817 | Dodge | Apr. 3, 1945 |
| 2,378,035 | Pollard | June 12, 1945 |
| 2,532,897 | Dodge | Dec. 5, 1950 |
| 2,546,378 | Winther | Mar. 27, 1951 |
| 2,591,342 | Dodge | Apr. 1, 1952 |
| 2,597,245 | Kelbel | May 20, 1952 |
| 2,606,460 | Kelley | Aug. 12, 1952 |
| 2,609,706 | Jandasek | Sept. 9, 1952 |
| 2,612,792 | Wilson et al. | Oct. 7, 1952 |
| 2,616,310 | Jandasek | Nov. 4, 1952 |
| 2,725,762 | Hettinger et al. | Dec. 6, 1955 |

FOREIGN PATENTS

| | | |
|---|---|---|
| 469,881 | Great Britain | Aug. 3, 1937 |